United States Patent [19]

Wyman et al.

[11] 4,035,715
[45] July 12, 1977

[54] CURRENT MONITORING OF A MODULAR POWER CONTROLLER

[75] Inventors: Kenneth R. Wyman; Gerard A. Gallagher, both of Pittsburgh, Pa.

[73] Assignee: Contraves-Goerz Corporation, Pittsburgh, Pa.

[21] Appl. No.: 628,848

[22] Filed: Nov. 5, 1975

[51] Int. Cl.$^2$ .......................................... H02P 5/16
[52] U.S. Cl. ................................. 323/4; 318/332; 323/9; 323/75 E
[58] Field of Search ......... 318/332, 345; 321/27 R, 321/27 MS; 323/4, 9, 17, 20, 23, 25, 48, 75 E

[56] References Cited
U.S. PATENT DOCUMENTS

| 3,521,150 | 7/1970 | Bates | 323/25 X |
|---|---|---|---|
| 3,675,114 | 7/1972 | Nercessian | 323/23 X |
| 3,694,764 | 9/1972 | Barron | 323/20 UX |
| 3,815,014 | 6/1974 | Davis et al. | 323/20 |
| 3,828,207 | 8/1974 | Shaw | 321/27 MS |

Primary Examiner—A. D. Pellinen
Attorney, Agent, or Firm—Robert D. Yeager; Howard G. Massung

[57] ABSTRACT

A power processor having improved current monitoring constructed from a plurality of power output modules which can be added or removed as desired to change the power output rating. The electrical output of the individual power modules are removably attached to an output combining structure. The electrical connections to the output combining structure also provide mechanical support for the power output modules. The servo controller is constructed so that as additional power modules are added, each provides a predetermined proportion of the output power. That is, each module will add in a linear fashion to the total output capability of the amplifier. The disclosed modular servo controller includes an improved current sampling circuit. A feedback signal is derived from the power output modules to protect the servo controller. The protection of the power controller is one function of the feedback signal, in that, it limits the maximum current derivable from the controller under normal conditions. The primary function of the current feedback signal is to provide an error signal which when combined with the input command causes the current output to be properly metered to a load. The feedback signal can be obtained from only one of the output modules since load current sharing is provided in the paralleled output module to a degree sufficient to guarantee that sampling the current flow through one module produces a signal proportional to the actual total load current. Alternately, the feedback current signal can be obtained from a composite signal derived from individual signals from each module. A third way of obtaining the feedback signal is through a sampling of the combined output currents from each module.

23 Claims, 18 Drawing Figures

CURRENT MONITORING OF A MODULAR POWER CONTROLLER

BACKGROUND OF THE INVENTION

1. Field of the Invention

This invention is related to a power processing system and, more particularly, to a power controller, constructed with individual power output modules, having improved output current monitoring.

2. Description of the Prior Art

In some prior art power controllers, it is necessary to have a feedback signal related to current to provide adequate protection and control of the device. Some prior art devices have output sections configured as a bridge in which the current feedback signal is derived from a shunt disposed in series with the load at the bridge output. This generally provides a signal having poor form factor with little usable information because of the presence of high common-mode voltages at the shunt. It has been discovered and recognized that by placing two sampling resistors, one in each leg of the bridge circuit at the common connection point, a superior current feedback signal can be derived using a differential amplifier.

SUMMARY OF THE INVENTION

A power controller is provided wherein the power output capacity of the controller can be varied in increments by adding modules as necessary to meet the load requirements. The disclosed controller utilizes identical power modules which can be easily attached or removed. Each module contains power semiconductors for supplying controlled amounts of output current at a rated voltage. Additional power modules can be attached to a common mechanical and electrical structure so that the addition of each module will add in a linear fashion to the total output capability of the power processor. That is, each module supplies a proportional amount of the total output current. Each module is constructed to assure that the sharing of the load is within certain limits, such as 10%.

Current feedback is provided for control and protection of the disclosed power processor. With the forced load sharing provided, it is feasible to provide a current feedback signal from only one module, knowing the other modules cannot vary from this amount by more than a predetermined amount. This current feedback signal represents, within the limits of load sharing, current in any of the other modules not sampled. Hence, with proper scaling, a signal representative of total load current can be derived from the signal obtained from the sample module.

In another embodiment of the invention, the current feedback signal can be derived from a composite signal of the current in all of the power modules. Each power module is provided with a sampling resistor, the output of which is combined to form a composite current feedback signal.

In yet another embodiment of the invention, two separate sampling resistors located external to the individual modules are employed to sample the composite current flowing through the paralleled modules. One of the sampling resistors is placed in each side of the power output bridge. They are so situated that one end of each resistor is joined to the bridge circuit common point. In this configuration, the total load current that alternately flows in each side of the bridge circuit flows through, and is thus sampled by, these separate sampling resistors.

As before, the signals obtained from said resistors are amplified by a differential amplifier. The resultant current feedback signals are representative of the total load current.

In another embodiment of the invention, a plurality of power processors are paralleled and load sharing among the respective output stages is provided. Utilizing the teaching of the present invention, a power processor having any number of output stages can be constructed.

It is an object of this invention to teach a power processor constructed to accommodate a plurality of power output modules which can be easily added or removed to vary the output capacity.

It is an object of this invention to teach a modular power processor having a bridge connected output with a sampling resistor in each leg of the bridge, near a common point, and a differential amplifier connected to each sampling resistor to provide a good current signal to a third differential amplifier which provides a current feedback signal.

It is another object of this invention to teach a power controller having a plurality of power output modules wherein load sharing among the modules is present and a feedback signal representative of current flowing through each module is derived from only one of the modules.

BRIEF DESCRIPTION OF THE DRAWINGS

For a better understanding of the invention, reference may be had to the preferred embodiments exemplary of the invention shown in the accompanying drawings in which.

DESCRIPTION OF THE PREFERRED EMBODIMENT

Figures 1, 2, 6:
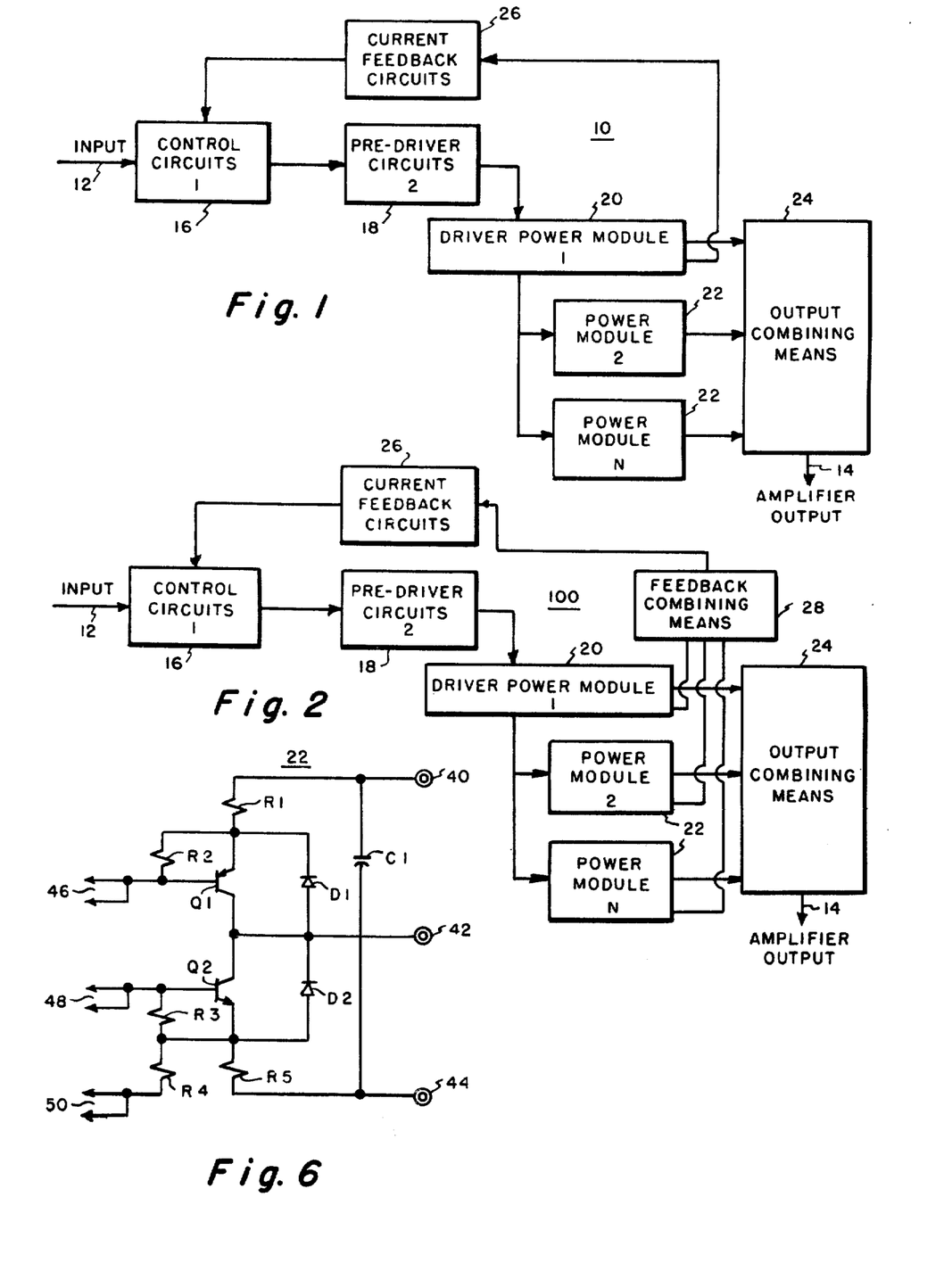
FIG. 1 is a block diagram of a servo controller utilizing the teaching of the present invention showing a current feedback signal derived from one module.
FIG. 2 is a block diagram of a servo controller utilizing another embodiment of the present invention wherein a current feedback signal is derived from each module.
FIG. 6 is a schematic of a power output module without the driver circuit.

Referring now to the drawings and FIG. 1 in particular, there is shown a servo controller 10 utilizing the teaching of the present invention. Servo controller 10 is provided with an input 12 and an output 14 which can feed various loads. Input 12 is connected to control circuit 16 which feeds predriver circuits 18. The output of predriver circuits 18 feeds a driver and power module 20. Driver and power output module 20 provides the driver signal to drive additional modules 22 when required. The output of the driver and power module 20 and the connected power modules 22 are combined by output combining means 24. Output combining means 24 provides mechanical support for the driver and power output module 20 and the power output modules 22 through the electrical connections to the associated modules. Each module 20 or 22 is constructed to provide a proportional share of the power output of servo controller 10. A current feedback signal is provided by current feedback circuits 26 to control operation of servo controller 10. The feedback signal through current feedback circuits 26 is derived only from the driver and power output module 20. Since load sharing among various modules 20 or 22 is provided, the feedback signal through current feedback circuits 26 is representative of the current flow through the other power modules within the limits of the load sharing. The temperature rise of driver and output module 20 can be monitored and used for protection of associated apparatus and this should also be representative of the maximum temperature of other modules 22. By virtue of the sharing circuits in modules 20 or 22, it is known that current in any other module cannot vary by more than 10% from the proportional share. The capacity of servo controller circuit 10 can be increased by adding additional power modules 22 as desired. By sampling feedback current from only one module 20, circuit simplification is obtained.

Referring now to FIG. 2, there is shown another servo controller circuit 100 utilizing a different embodiment of the present invention. Servo controller 100 is provided with control circuit 16, current feedback circuits 26, predriver circuits 18, driver and power output modules 20, output modules 22, and output combining means 24 as described above. Servo controller 100 additionally includes a feedback combining means which samples a current feedback signal from each module 20 or 22. Feedback combining means 28 can form either a composite feedback signal of all the current outputs or can provide a signal representative of the highest current supplied by any module 20 or 22. Power modules 22 can be added or subtracted to vary the output capacity of servo controller 100. The output combining means also provides a common mechanical structure for supporting the various modules 20 or 22. The output of each module 20 or 22 is combined by the output combining means in an output summation which yields a composite output which is generally referred to as the amplifier output. The feedback signal can include both voltage and current and other parameters which may be important for various amplifier constructions.

Figures 3, 4:
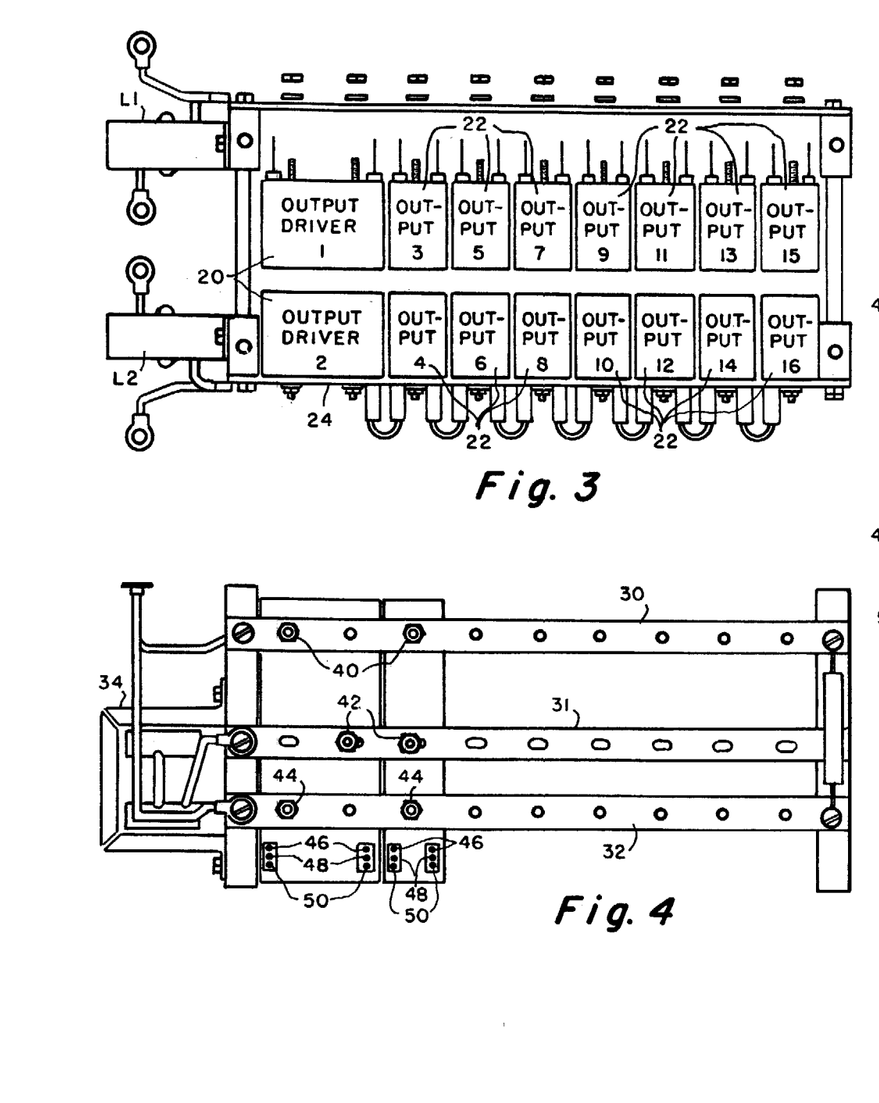
FIG. 3 is a top view of a portion of the power output section of a servo controller, connected in a bridge configuration, showing the power modules.
FIG. 4 is a side view of a portion of the power output section shown in FIG. 3.

Referring now to FIGS. 3 and 4, there is shown the output combining means 24 and a plurality of modules 20 or 22 mounted thereto. As can be seen best in FIG. 4, output combining means 24 includes spaced apart conducting rails 30, 31 and 32 to which the electrical output connection of modules 20 or 22 are attached. These electrically conducting rails 30, 31 and 32 also provide mechanical support for the modules 20 or 22. Driver and power output module 20 includes a driver portion and a power module portion which is similar to that contained in power module 22. The output of combining means 24 is fed through inductors L1 or L2 which limit the rate of change of output current to provide some system protection.

Referring now to FIG. 6, there is shown a power output module 22. Power output module 22 includes a PNP transistor Q1 and an NPN transistor Q2 which are complementary power transistors that act as power switches conducting a proportional share of the total controller 10 output current. Resistors R1 and R5 are emitter resistors that act to force the transistors Q1 and Q2 to conduct a proportional amount of the output current. That is, when a plurality of power output modules 22 are connected in parallel, resistors R1 and R5 assure that current sharing among the various output modules will be fairly even. The value of R1 and R5 are selected to assure that the load sharing among the various modules will be within 10%. R2 and R3 are base emitter resistors that act to bypass leakage current around the associated transistor in such a manner as to prevent false conduction or premature voltage breakdown. Resistors R2 and R3 are especially important at elevated operating temperatures. Diodes D1 and D2 are free-wheeling diodes that act to conduct inductive load currents during periods of time when Q1 and Q2 are turned off. That is, when load current is flowing through either transistor Q1 or Q2 and they are switched off, inductance in the circuit will cause the voltage to rise, foward biasing the free-wheeling diode D1 or D2 and thus potentially damaging current will be shunted through one of these diodes D1 or D2. R4 is part of a composite current limiting resistor for the predriver transistors Q26 or Q37 shown in FIG. 8B. Resistor R4 acts in effective parallel with other similar resistors in other parallel modules 22 to limit current from predriver transistors Q26 or Q37 to a safe value. Terminal 40 is provided for making a connection to a positive voltage bus 30 or line 111. Terminal 42 is provided for making a connection to the output bus 31 of combining means 24 from which the load connections are taken. Terminal 44 is provided for making a connection to the common circuit bus 32 or line 112. Each power module is provided with three input connections 46, 48 and 50. Each input connection 46, 48 or 50 is provided with two connection points for easy connection to adjacent modules. A driver signal can be provided on connectors 46 and 48 for transistors Q1 or Q2, respectively. Connector 50 completes a circuit to resistor R4 which limits current from driver transistors Q37 or Q26, when used in a bridge connection as shown in FIG. 8B. Capacitor C1 is an integral capacitor that acts to smooth the voltage on the DC bus at each module.

Figure 5:
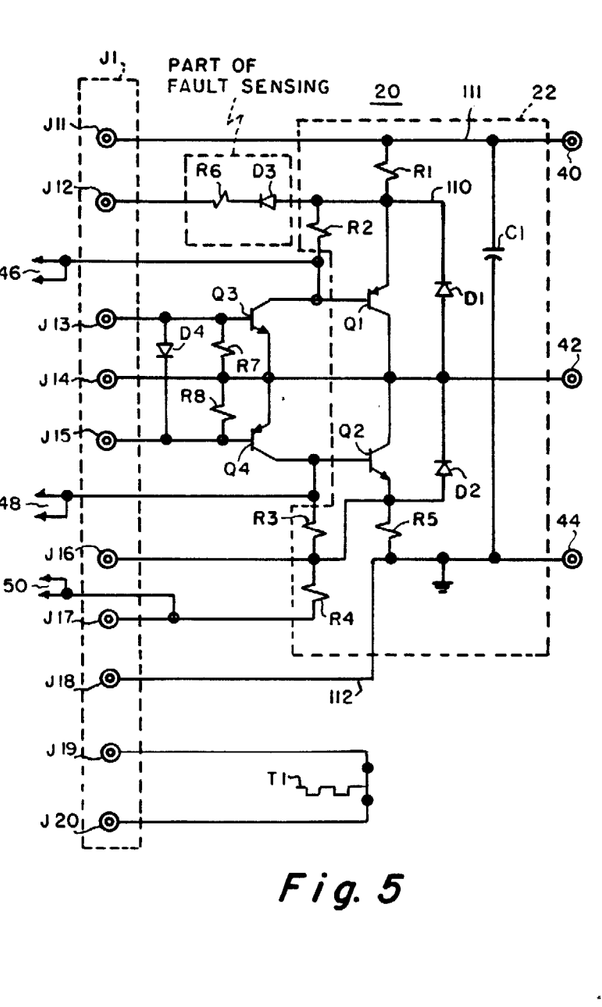
FIG. 5 is a circuit schematic of the first output power module which also includes the driver circuit for the other output power modules.

Referring now to FIG. 5, there is shown a circuit for a combined driver and power output module 20. Driver and output module 20 includes a power output circuit 22 as shown in FIG. 6 and described in detail above. Driver and power output module 20 also includes a temperature sensing portion, a driver portion, and a fault sensing portion. Transistors Q3 and Q4 are NPN/PNP complementary transistors acting as driver transistors for transistors Q1 and Q2 of the integral output circuit 22 and any other connected power module circuits 22. Resistors R7 and R8 are base-emitter resistors associated with transistors Q3 and Q4, respectively, for conducting leakage current around the associated devices. Resistors R7 and R8 prevent false conduction and premature voltage breakdown, especially at elevated device temperatures. Diode D4 is a fast recovery type diode that acts to prevent the conduction of transistor Q3 when transistor Q4 is conducting, and conversely to prevent transistor Q4 from conducting when transistor Q3 is conducting. Output connections 46, 48 and 50 are provided, each having two terminals to facilitate connection to adjacent modules 22. Driver transistors Q3 and Q4 drive all transistors Q1 and Q2 in the parallel connected output modules. A temperature sensing switch T1 is provided on circuit 20 in proximity to the primary temperature generating elements which are transistors Q1, Q2, Q3 and Q4. Thermal switch T1 is part of the output driver module and acts to monitor the temperature of this module. When temperature switch T1 operates, the associated power processor is disabled. Power and driver module 20 is provided with a 10 terminal connector J1 having output terminal connections J11 through J20. J19 and J20 provide connections to thermal switch T1. J11 provides a connection to the positive bus from the printed circuit board. J12 provides a connection to the over current protection portion of module 20. J13, J15 and J17 provide connections to module 20 from the predriver circuit. Connectors J16 and J18 provide connections for the current feedback signal.

In FIG. 8B, resistor R134 provides current limiting for predriver transistor Q30 and resistor R112 provides current limiting for predriver transistor Q19. Resistor R4, rather than using a current limiting resistor such as R134 or R112, is placed in each module 20 or 22 to limit the current through predriver transistor Q26 or Q37. Resistor R4 also functions to evenly distribute the current from the predriver transistor Q26 or Q37 to each module 20 and 22. An alternate to this construction would be to use a resistor such as R134 connected to the collector of transistor Q37 and also tie the emitter of transistor Q37 to the common line 112. This could by-pass a substantial amount of current around current sampling resistor R5. With the addition of R4, the current which can flow through transistor Q37 is limited and all current flowing through Q37 flows proportionately through each sampling resistor R5 in each paralleled module 20 and 22.

Driver module circuit 20 is also provided with a fault sensing portion consisting of diode D3 and resistor R6. As current flows through resistor R1, line 110 becomes negative with respect to positive line 111, due to the current flow through resistor R1. Current flow through network D3, R6 can become sufficiently small, for large enough values of current through R1, to provide actuation of an overcurrent fault circuit located on the controller main printed circuit board. This circuit acts to disable the servo controller when the current flow exceeds a predetermined overload value. R6 is also used to combine the signal sensed from R1 with similar signals from the driver and output module 20 connected on the opposite side of the bridge. Diode D3 acts to compensate for temperature caused changes in the resistance of R1 which is an etched foil resistor.

Figure 7:
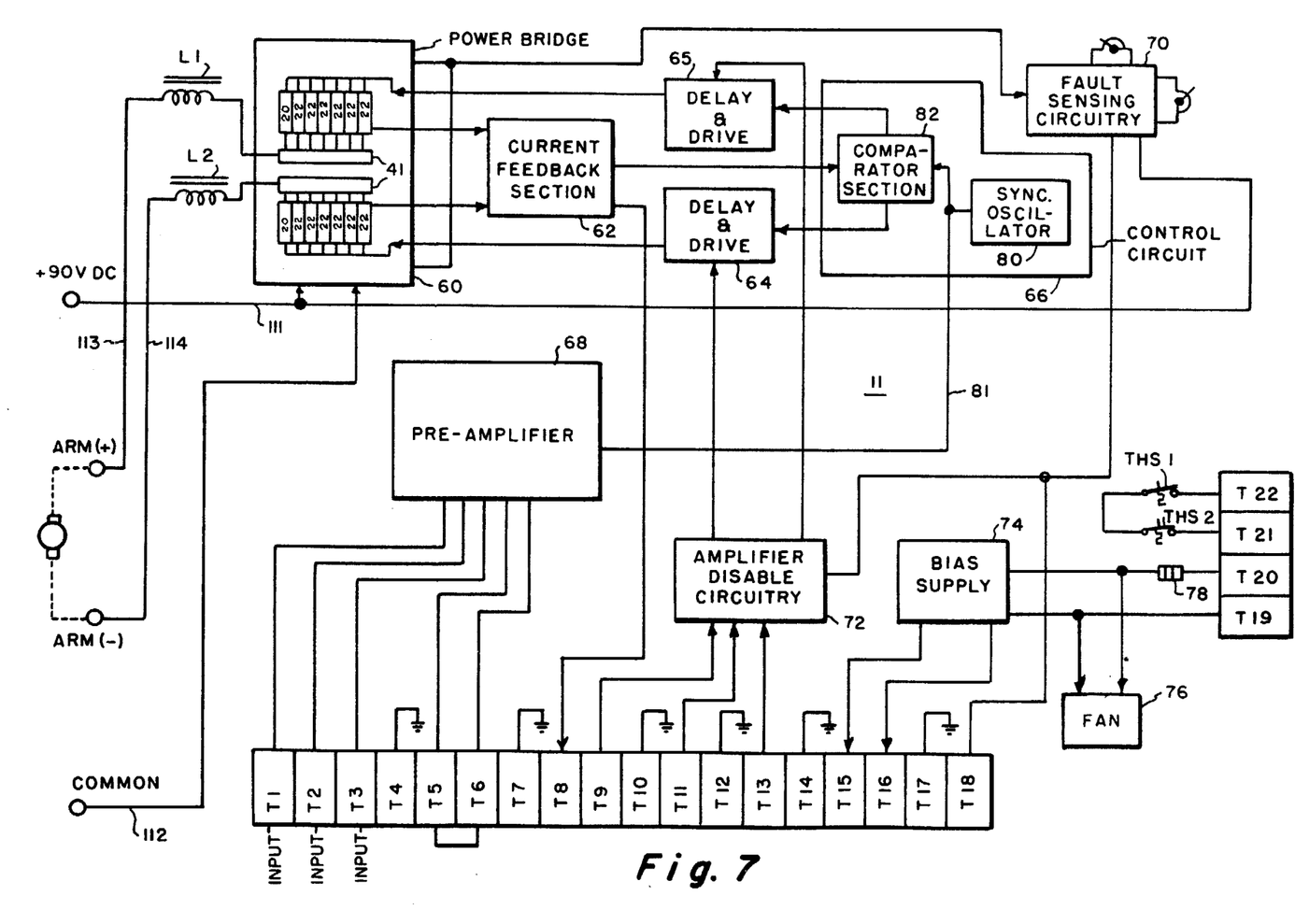
FIG. 7 is a view of a servo controller constructed according to the teaching of the present invention with the power output modules connected in a bridge configuration.

Referring now to FIG. 7, there is shown a more detailed block diagram of a servo controller 11 having the output of modules 20 or 22 connected in a bridge configuration. The servo controller 11 shown in FIG. 7 includes a power bridge output section 60, a current feedback section 62, delay and drive sections 64 and 65, a synchronization and comparator section 66, a preamplifier 68, output inductors L1 and L2, thermal switches THS1 and THS2, fault sensing section 70, amplifier disable circuitry 72, and a bias supply 74. Input terminals T1, T2 and T3 are also provided for making electrical connections to the servo controller 11. A fan 76 is provided for cooling the power semiconductors utilized in controller 11. A fuse 78 provides protection for the fan 76 and the bias supply circuit 74 of controller 11.

Preamplifier 68 which has input connections to terminals T1, T2 and T3 amplifies and combines various input signals including a tachometer feedback signal, for presentation to the power sections of controller 11. Preamplifier 68 filters and scales the various input signals and amplifies the combined error signal. Preamplifier 68 processes the combined error signal through a servo compensation network and also limits the maximum value of positive and negative voltage signals at its output so as to limit the ultimate current flow through the power output section and load. Preamplifier 68 has appropriate adjustment potentiometers to accomplish the desired compensation, voltage limiting and scaling functions.

The synchronization and comparator section 66 includes a synchronization oscillator 80 and a comparator network 82. Oscillator 80 provides a synchronization signal in the form of a triangular wave shape. This triangular signal acts to modulate the signal obtained from the preamplifier section, along line 81, to form a third signal which is fed to comparator section 82. The combined signal fed along line 81 to comparator section 82 is combined algebraically with the current feedback signal from current feedback sections 62. The total combined signal acts to modulate the switching point of comparator section 82. The output of comparator section 82 is fed to delay and driver sections 64 and 65. Section 66 supplies identical digital signals to delay and driver sections 64 and 65.

The output of delay and driver sections 64 and 65 are in turn fed to the input of power bridge 60. Delay and driver sections 64 and 65 are supplied with identical digital signals from comparator 82. Delay and driver sections 64 and 65 are the same except for an additional inverter circuit at the input to delay and driver 65. The function of the inverter in delay and driver 65 is to supply a logic negative signal to that delay and driver section 65. The function of the delay and driver section is to delay by a controlled amount the positive ON signal; but not delay the negative OFF signal as these signals pass through associated delay and driver sections. In addition to ON delay sections 64 and 65 provide the required circuitry to provide the appropriately phased and amplified signals to the output bridge section 60.

The power bridge output section 60 comprises two output and driver modules 20 which are connected in a bridge output configuration. Up to seven output modules 22 can be connected in parallel with each driver and output module 20. Thus, each side of the power bridge 60 has one driver and output module 20 and up to seven output modules 22 connected in parallel. Current from the associated output circuits 20 flows through combining means 41 which comprises mechanical supports and current collectors 30, 31 and 32. The modules 22 or 20 are mounted to a mechanical structure, part of which consists of aluminum current collector rails 30, 31 and 32 which act as the combining means 41 for the modules. The modules 20 and 22 are configured electrically and mounted mechanically so as to form a bridge or H output power section 60.

Figure 14:
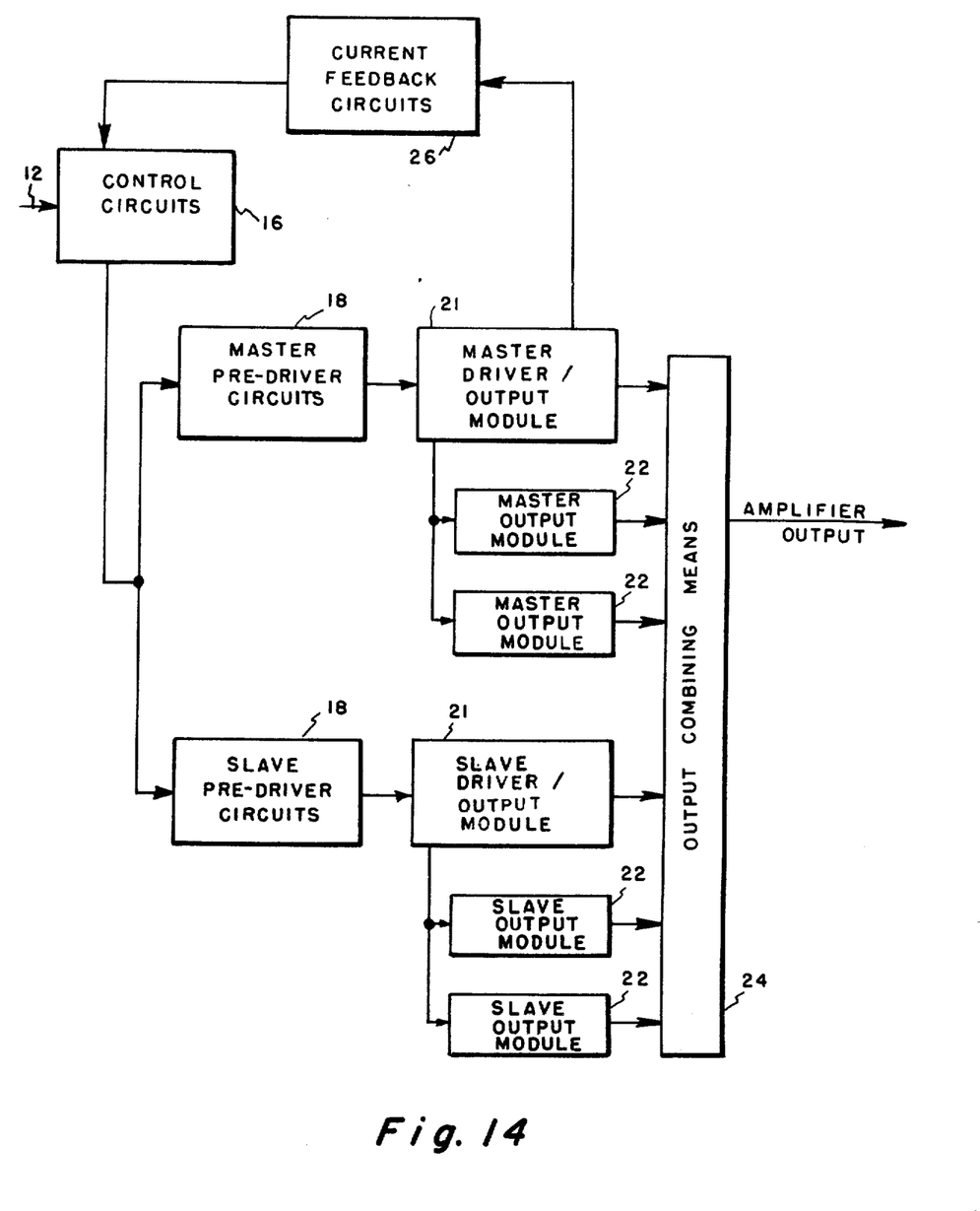
FIG. 14 is a block diagram of a servo controller which can operate in parallel a large number of output modules; and, FIG. 15 is a circuit for assuring load sharing in the block diagram of FIG. 14.

Referring now to FIG. 14, there is shown an embodiment wherein load sharing among a plurality of driver and output modules 21 is provided. Each driver and output module 21 drives a plurality of output modules 22 which are forced to load share, with the embodiment shown, any number of modules 22 can be operated in parallel with proportional load sharing. The current feedback circuit 26 is connected to only a master driver and output module 21 which provides a current signal representative of current flow in all other modules 21 or 22.

Figure 15:
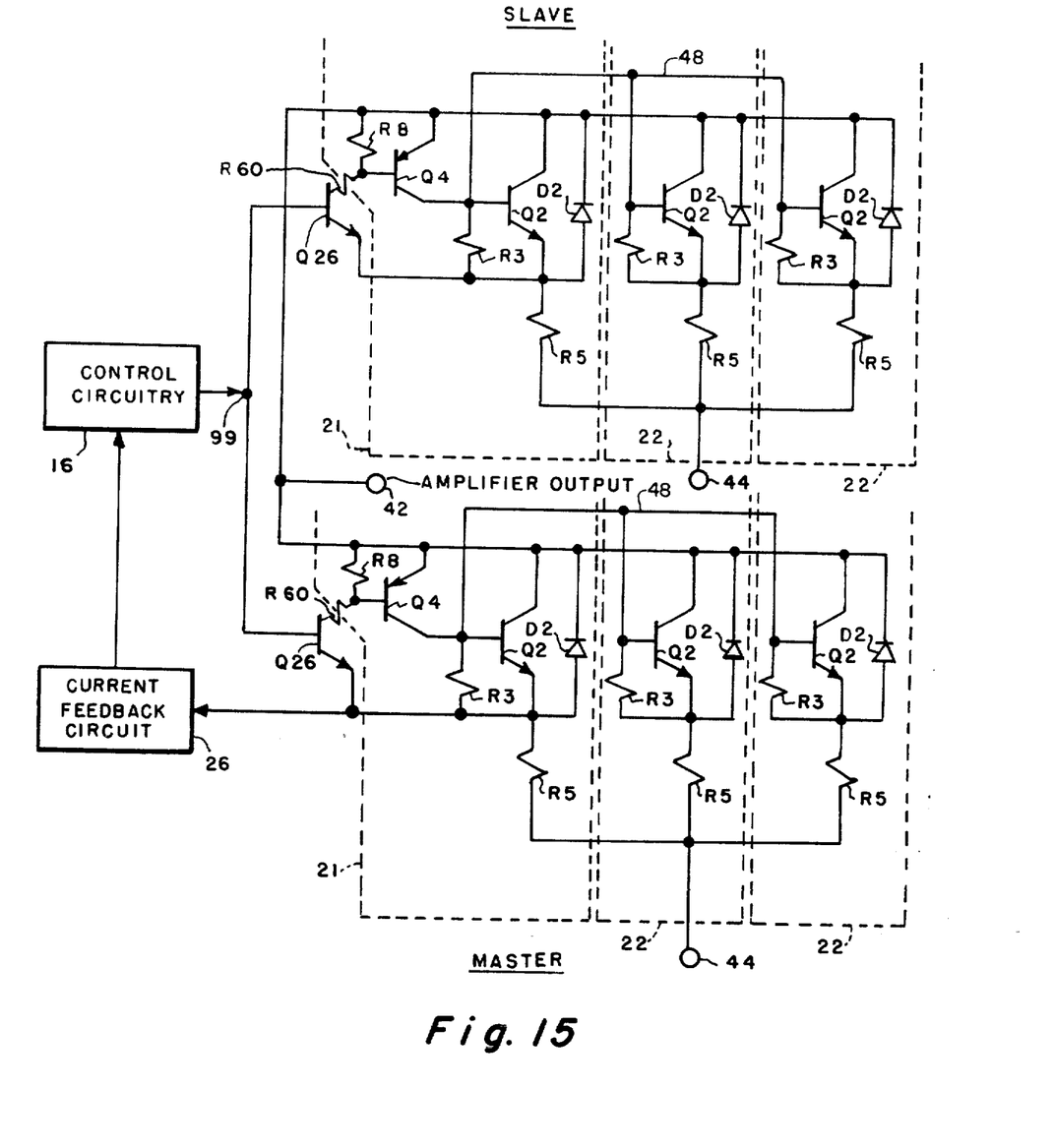

Referring now to FIG. 15, there is shown in more detail a portion of the controller shown in FIG. 14. Only the bottom portion of one side of a bridge connected output is shown. FIG. 15 shows only one additional slave driver and output module 21, but additional units, as required, can be added. Operation of the driver and output module 21 and the output modules 22 is generally the same as described above. All output modules 22 are forced to current share with their associated driver and output module 21 because of their emitter resistor, R5. That is, all of the associated output transistors have their base at a common connection 48 and the one side of R5 at another common connection, 44. Thus, the potential from the base of transistor Q2 to the common connection 44 is the same for all the associated transistors Q2 driven from the same driver and output module 21. If one of the paralleled transistors Q2 supplies a relatively greater amount of load current, the voltage drop across its emitter resistor R5 increases, raising the potential of the emitter of that transistor, Q2, which reduces the amount of current conducted by that transistor Q2. That is as, the potential at the emitter is increased the base emitter voltage drop is decreased, reducing base current and thus the amount of transistor, Q2, current output. All of the transistors Q2 driven from the same driver and output module 21 share a proportional amount of current. In the disclosed controller, up to seven output modules can be driven from an associated driver and output module 21. Driving more than seven modules might overload the driver transistors Q3 or Q4. One solution would be to increase the size of these transistors. However, the preferred solution is to utilize standard drive transistors Q3 and Q4 and to parallel a plurality of driver and output modules 21.

When a plurality of driver and output modules 21 are operating in parallel, it is necessary that all output modules 22 provide relative load sharing. This can be accomplished by providing for load sharing among the driver and output modules 21 and these in turn cause load sharing with their driven output modules 22. As shown in FIG. 15, when a plurality of driver output modules 21 are operated in parallel, the bases of the predriver transistors Q26 are tied to a common point 99. The emitter of each transistor Q26 shares the emitter resistor R5 with the driver and output module 21. Thus the potential from the common base point 99 of each predriver transistor Q26 to common 44 is the same. If any of the transistors Q2 of driver and output module 21 conducts a larger portion of output current, the potential at the emitter of transistor Q26 is increased thus decreasing current output and regulating the driver output modules 21 to supply a proportional amount of load current. This construction regulates the amount of load current which each transistor Q2 of driver and output module 21 puts out, it does not necessarily regulate the predriver currents. The predriver currents can be slightly different depending on variations in transistors Q4 and Q26. However, the output of each driver output module is regulated, and these in turn have associated output modules 22, the outputs of which are regulated. Thus the current from all output modules connected in parallel are controlled proportionately. Although a bottom quadrant representation was used to demonstrate the sequence of current sharing, the top quadrant functions similarly.

A current limiting resistor R60 is provided in the connection to the collector of transistor Q26. Driver and output module 21 is similar to driver output module 20. The only difference being that driver and output module 21 does not utilize resistor R4.

The bridge output connection has advantages over alternate type connections. The bridge output section has desirable features not possessed by the alternate bi-directional type of output section, the so-called single ended amplifier. For power transistors with the same voltage capability, the bridge configuration provides twice the load voltage magnitude obtainable with a single ended amplifier. A disadvantage with the single ended switching type amplifier is that a voltage magnitude increase occurs in one of the two power supplies in the single ended amplifier when it provides a constant DC current to an inductive load. The voltage increases, if not controlled, will eventually cause breakdown of the power transistors and/or associated components. The bridge type configuration prevents this voltage magnitude increase by providing for regenerative feedback from the load.

Referring again to FIG. 7, the output from combining means 41 is processed through output inductors L1 and L2. These output inductors L1 and L2 have relatively small values, just being large enough in inductance to limit the rate of current rise, $di/dt$, in the load circuit in the event of a short circuit to the common connection 112. The delayed current rise allows sufficient lag time for the over current protection circuit to operate and disable the controller before damage occurs. This precaution prevents catastrophic failures due to short circuits across the load or from either output to ground or common.

Thermal switches THS1 and THS2 provide thermal protection for controller 11. These devices, THS1 and THS2, provide a contact opening signal in the event of an over temperature condition. Fan 76 provides ambient air flow for cooling of the power semiconductors. If for example, the cooling fan fails or the ambient temperature increases beyond a predetermined point, thermal switches THS1 and THS2 can disable servo controller 11. The sensor for each thermal switch is connected in associated driver output modules 20. These modules 20 are mounted the furthest from the cooling fan 76 and hence should be the warmest. By providing thermal protection for these modules, the other output modules 22 are also protected.

Current feedback section 62 provides a current feedback signal to synchronization section 66. The current feedback signal provided by section 62 can be obtained from the power bridge section 60 by any of the methods described herein.

Amplifier disable circuitry 72 is also provided for disabling controller 11 due to a malfunction. Disable circuitry 72 disables the servo controller 11 in response to an externally applied signal from terminal T9, T11 or T13. Amplifier disable circuitry 72 is also connected to be activated by fault sensing circuitry 70. Fault sensing circuitry 70 is connected to power bridge 60 and supplies a disable signal to circuitry 72 upon the occurence of either an overload current flow through power bridge 60 or an overvoltage condition at power bridge 60. Controller 11 can be limited in either direction of motor rotation.

A bias supply 74 is provided to provide a low power bias supply that provides regulated positive and negative 15 volt DC for the low level controller circuit. The bias supply also supplies an unregulated positive 24 volts DC for part of the delay and driver circuit sections 64 and 65.

Figure 8A:
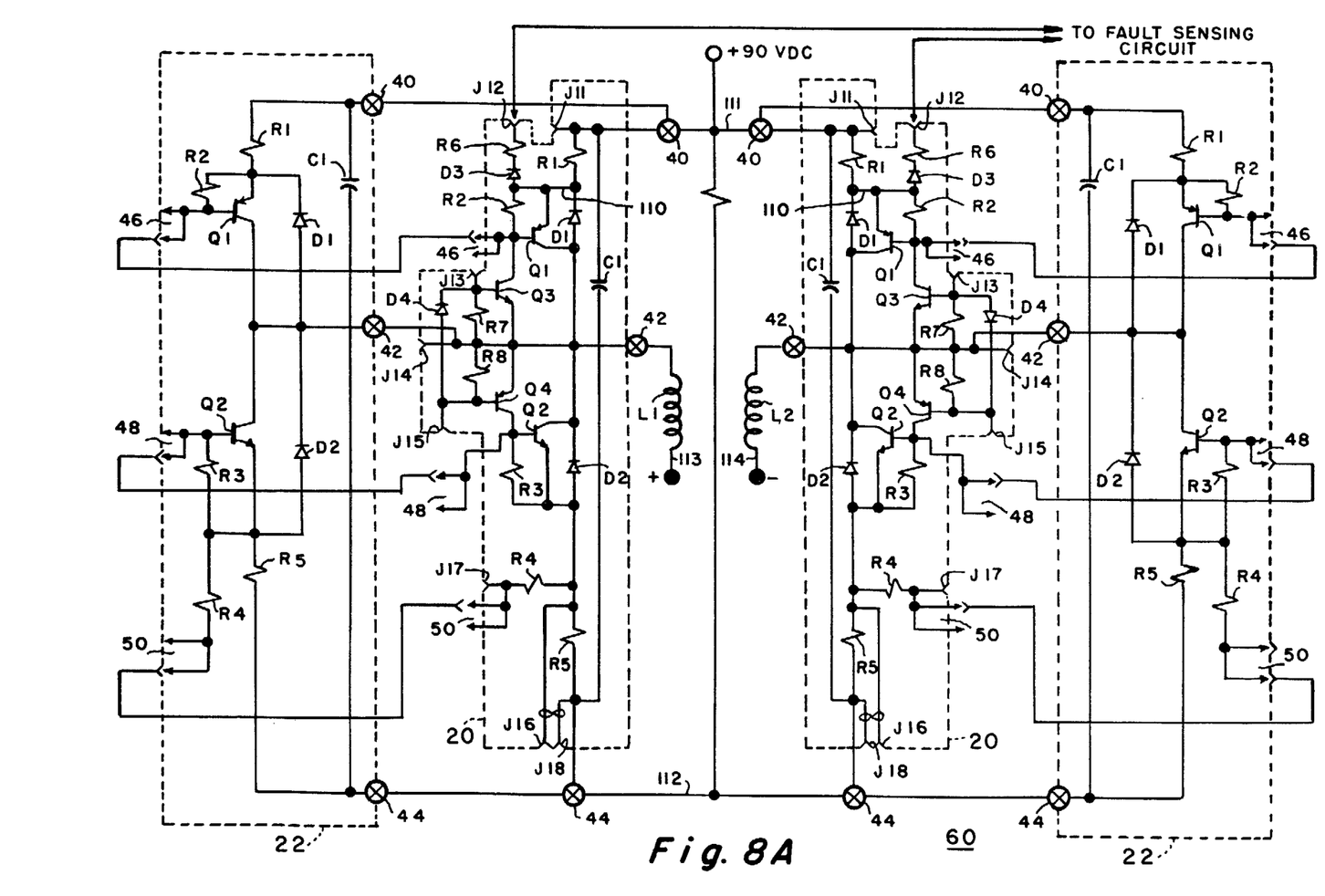
FIGS. 8A, 8B, 8C and 8D show a detailed circuit of a servo controller shown in FIG. 7 utilizing the teachings of the present invention.
Figure 8B:
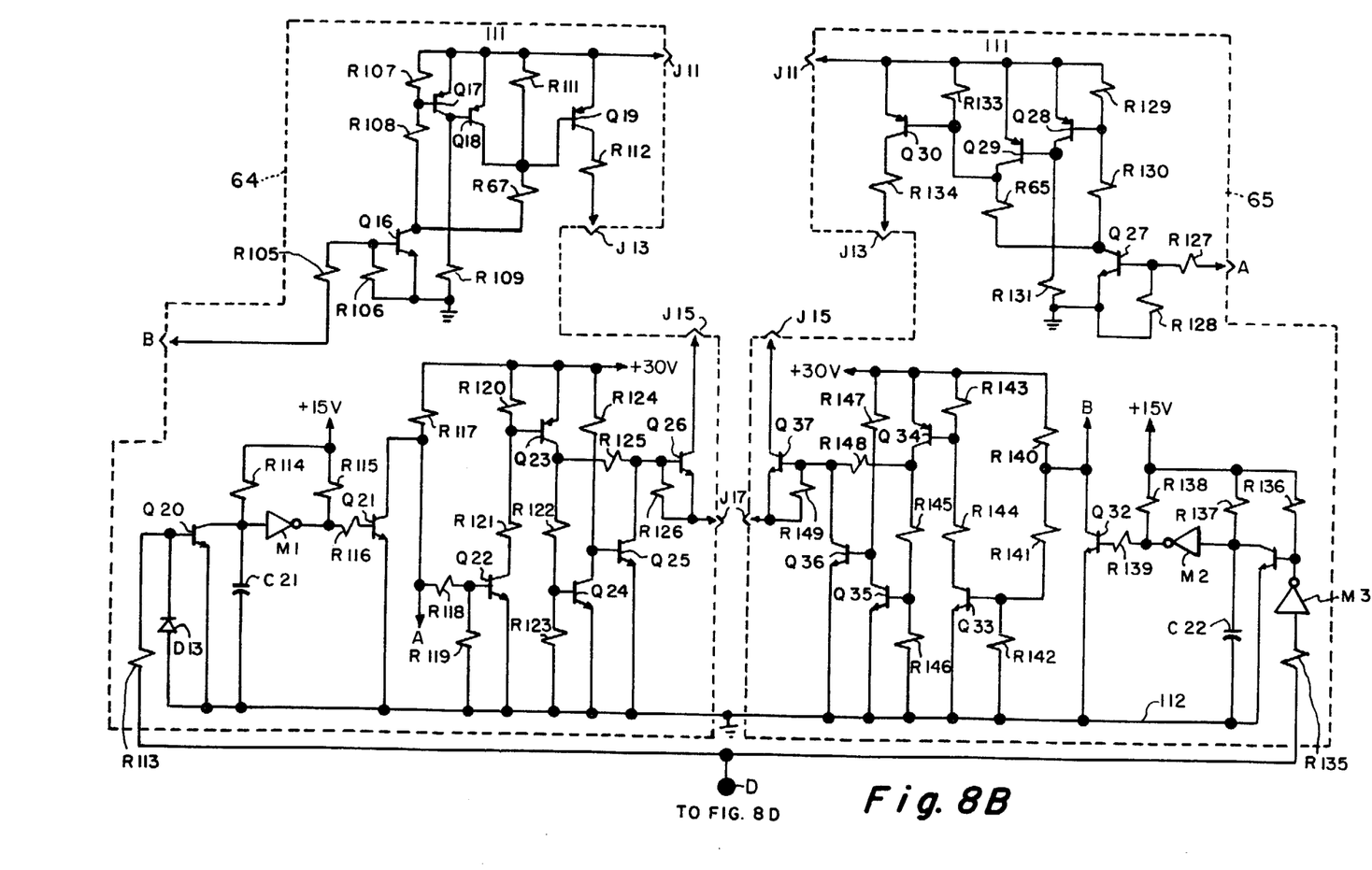

Referring now to FIGS. 8A, 8B, 8C and 8D, there is shown a detailed schematic of a servo controller 11 utilizing the teaching of the present invention. FIG. 8A shows schematically two driver and output sections 20 connected in a power bridge configuration. Each driver and output section 20 has an output section 22 connected in parallel therewith. The output of these sections 20 and 22 are supplied through inductors L1 and L2 to outputs 113 and 114 which is connected to a load which is usually a DC type motor.

Figure 8C:
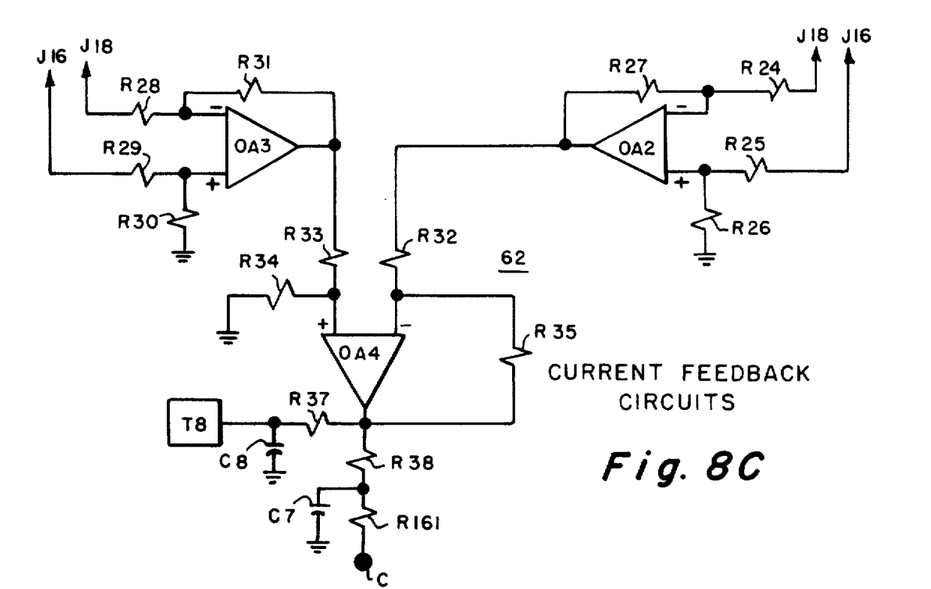

FIG. 8B shows schematically the connection of delay and driver sections 64 and 65 to power bridge 60. FIG. 8C details schematically the current feedback section 62. The function of circuit 62 is to differentially sample the current signal at each side of the bridge using operational amplifier OA3 for one side and operational amplifier OA2 for the other side. These signals are sequentially combined differentially in operational amplifier OA4. The double differential scheme eliminates common mode voltages from the current feedback signal which would otherwise distort the signal. Because of the differential combining the signal at C is an accurate representation of the current flowing in the load circuit. The current sampling is accomplished in the two lower legs of the power output bridge 60 near common line 112, thus eliminating a great problem encountered by many prior art amplifiers, with common mode voltages, which sample current with a shunt disposed in series with the load. Although current sampling using three differential amplifiers is preferred, it is to be understood that in some instances a usable signal may be obtained by a single differential amplifier. In an appropriate case differential amplifiers OA2 and OA3 may be omitted and the input connections, through resistors R32 and R33 to differential amplifier OA4, taken directly to the J16 connections to sampling resistors R5.

Figure 8D:
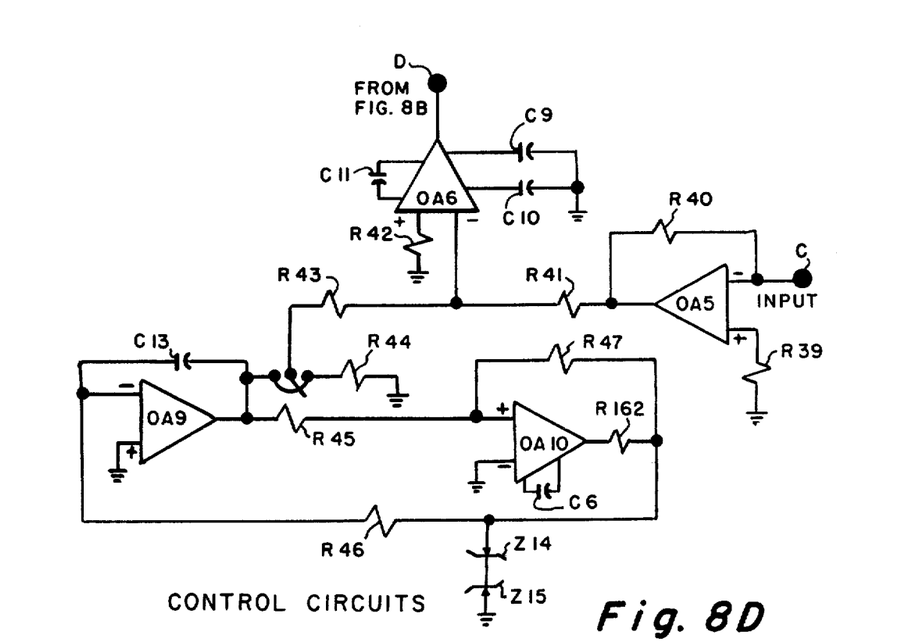

FIG. 8D shows schematically the control circuit section where current feedback and current command signals are first combined in operational amplifier OA5. The resultant signal is then combined with a synchronization signal from a triangular wave form generator, consisting of operational amplifier OA9, OA10 and the associated circuitry. The combined signal is fed to comparator OA6, the output of which is fed to each delay and driver section 64 and 65 for further processing.

The following are the component values used in a servo controller as shown in FIGS. 8A, 8B, 8C and 8D in accordance with the teaching of the present invention:

| | |
|---|---|
| R1 | .05Ω |
| R2, R3, R7, R8 | 47Ω |
| R4 | 5.1Ω |
| R5 | .1Ω |
| R6, R44, R106, R128, R162 | 2K |
| R24, R25, R26, R27, R28, R29, R30, R31, R32, R33, R109, R116, R121, R131, R139, R144 | 10K |
| R34, R35 | 60.4K |
| R37 | 2.7K |
| R38, R39, R161 | 18K |
| R40 | 91K |
| R41, R42 | 39K |
| R45, R47 | 20K |
| R46 | 3.9K |
| R65 | 500Ω |
| R67 | 500Ω |
| R105, R127 | 510Ω |
| R43 | 82K |
| R108, R130 | 56K |
| R111, R126, R133, R149 | 200Ω |
| R112, R134 | .5Ω |
| R113 | 33K |
| R114, R136, R137 | 47K |
| R115, R119, R120, R123, R129, R138, R142, R143, R146, R107 | 5.1K |
| R117, R140 | 1.5K |
| R118, R141 | 4.3K |
| R122, R145 | 30K |
| R124, R135, R147 | 15K |
| R125, R148 | 220Ω |
| R162 | 390Ω |
| C1 | 30uf |
| C6, C11 | 3.3pf |
| C7 | .01uf |
| C8, C9, C10 | .1uf |
| C13 | .01uf |
| C21, C22 | .0022uf |
| OA6, OA10 | 748 |
| OA2, OA3, OA4, OA5, OA9 | 741 |
| M1, M2, M3 | 681 |
| D1, D2 | A115B |
| D4 | MR812 |
| D3 | 1N4006 |
| D13 | 1N4006 |
| Z14, Z15 | 1N758 |

Figure 9:
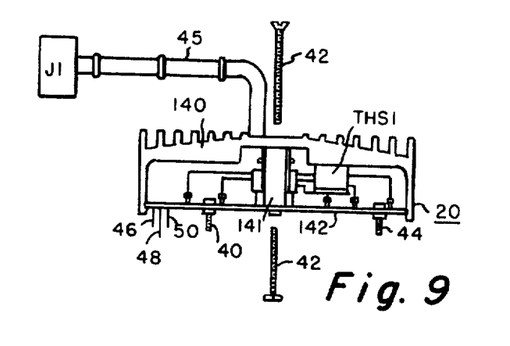
FIG. 9 shows a complete output power and driver module mounted to the associated heat sink.
Figure 10:
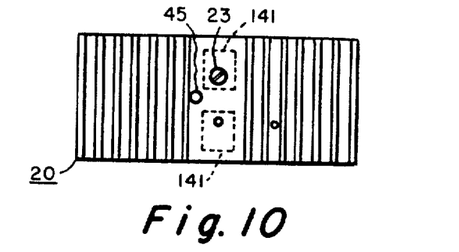
FIG. 10 is a top view of the output and driver module shown in FIG. 9.
Figures 11, 12:
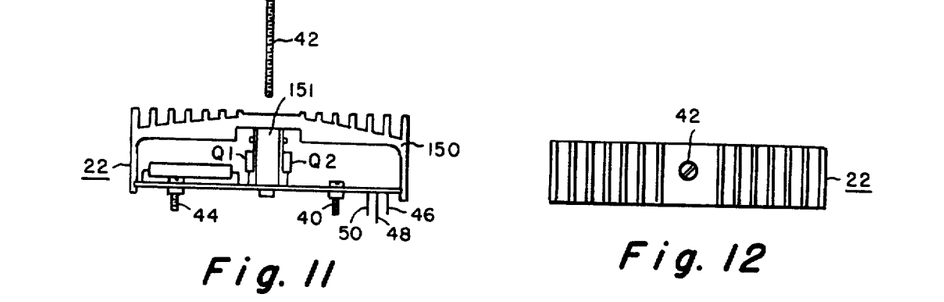
FIG. 11 shows a complete output module with the associated heat sink.
FIG. 12 is a top view of the output module shown in FIG. 11.

Referring now to FIGS. 9 and 10, there is shown an driver and output module 20 ready for mounting. Module 20 contains two intermediate heat sinks 141 and a final heat sink 140. The heat sinks 140 and 141 provide a good thermal path from the case of power transistors Q1, Q2, Q3 and Q4 to the ambient air which flows past the finned portion of heat sink 140. Cooling fan 76 provides for an air flow past the heat sinks 140 which comprise power output section 60. Output transistors Q1 and Q2, and driver transistors Q3 and Q4 are attached to intermediate heat sinks 141 which are connected in turn to the final heat sink 140 by bolts 42. Transistors Q1 and Q2 are attached to opposite sides of a heat sink block 141, while driver transistors Q3 and Q4 are attached to opposite sides of another heat sink block 141. Bolts 42 continue through printed circuits (PC) board 142 to form a stud for mounting to the rail 31 of the combining means 41, shown in FIG. 7. Bolt 42 also goes through the intermediate heat sink 141 which is drawn into good thermal contact with outer heat sink 140. Bolt 42 connects to current collector rail 31. A thermal switch THS1 is also connected to heat sink 140 for sensing over temperature conditions in driver and output module 20. Exiting from heat sink 140, at a location between the intermediate heat sinks 141, is a cable 45 which carries signals to and from the main printed circuit board. Module 20 also contains terminal studs 40 and 44 for making contact with the plus 90 volt power rail 30 and a common rail 32, respectively, of the combining structure 41, shown in FIG. 7. These studs also provide mechanical support for module 20. Terminal studs are inserted through printed circuit board 142 which provides interconnection between various component parts in the module 20. FIG. 10 is a top view of driver and and output module 20. Note that this module is double size compared to the output module 22 containing only the power output circuit. FIG. 11 shows a top view of a power output module 22. FIG. 12 shows a side view of power output module 22. Transistors Q1 and Q2 which are power output transistors are attached to intermediate heat sink 151 which is in turn attached to final heat sink 150 by output terminal bolt 42. Bolt 42 also serves as a terminal stud for attaching output modules 22 to the output rail 31 of the combining means 41. Terminal studs 40 and 44 and printed circuit board 142 serve the same purpose as described for FIG. 9 above.

Figure 13:
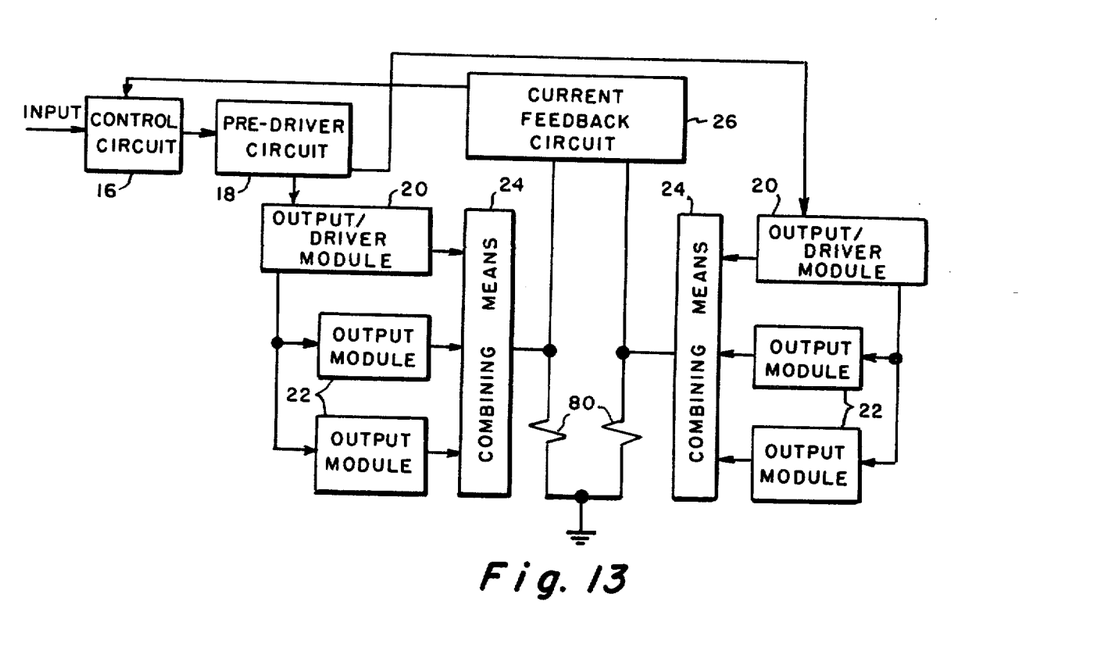
FIG. 13 is a block diagram of a servo controller connected with a bridge output showing a current feedback signal derived from shunt resistors in each leg of the bridge.

Referring now to FIG. 13 there is shown a third embodiment for current sampling. A single high power sampling resistor 80 is employed on each side of the bridge to sample current. The sample current signal is applied to the current feedback circuit 26. The current that flows through each sampling resistor 80 is combined current from all modules on each side of the bridge. Hence, modules cannot be as easily added or removed from the bridge, since a sampling resistor value change or scale factor change in the current feedback circuit is required each time a module is changed. This circuit also requires higher power sampling resistors since it must accommodate full circuit current. The resistors used for sampling in the other two embodiments must still be retained since they are used to force current sharing among the various modules.

What is claimed is:

1. A power processor comprising, input means for receiving inputs into the power processors; output means connected in a bridge configuration for providing an output to a load circuit from the power processor which has a characteristic of the input; control circuit means disposed between said input means and said output means for controlling said output means; and, said output means comprises:
a plurality of integral, detachable power output modules each comprises a semiconductor devices connected to define one side of a bridge and each supplying a proportional amount of the output power;
output combining means electrically connected to said plurality of integral detachable power output modules for combining the output from said plurality of integral detachable power output modules and providing mechanical support for said plurality of integral detachable power output modules;
said plurality of integral detachable power output modules interconnected to form a bridge having a common point;
each of said plurality of integral power output modules comprises a sampling resistor connected near the common point of the bridge;
first signal combining means for combining the current signals from the current sampling resistors on one side of the bridge;
second signal combining means for combining the current signals from the current sampling resistors on the other side of the bridge;
a first differential amplifier connected to the first current signal combining means connected on one side of the bridge;
a second differential amplifier connected to the second current signal combining means connected on the other side of the bridge; and,
a third differential amplifier connected to receive the output of said first differential amplifier and said second differential amplifier providing a current feedback signal indicative of the total current flow through the load circuit.

2. A power controller comprising, an input, an output section; a control circuit section connecting said input to said output section; feedback means feeding a signal back from said output section to said control section; wherein said output section comprises:
a plurality of output current combining conducting rails;
a first plurality of output power modules having an input connected to said control section and an output electrically connected to some of said plurality of output current combining rails and being supported from the electrical connection to said output current combining rails;
a plurality of current sampling resistors one disposed in each of said first plurality of output modules with the output power modules output current flowing therethrough;
load sharing means disposed in each of said first plurality of output power modules for causing load sharing among parallel connected modules; and,
said feedback means derives a feedback signal from only one of said plurality of current sampling resistors disposed in one of said first plurality of output power modules which due to load sharing is representative of the current through any other output modules connected to the same plurality of output current combining rails.

3. A power controller as claimed in claim 2 wherein: each of said plurality of output power modules includes an integral heat sink.

4. A power controller comprising, an input; an output section; a control circuit section connecting said input to said output section; feedback means feeding a signal back from said output section to said control section; wherein said output section comprises:
a plurality of output current combining conducting rails;
a first plurality of output power modules, which are connected in parallel, having an input connected to said control section and an output electrically connected to some of said plurality of output current combining rails and being supported from the electrical connection to said output current combining rails;
a second plurality of output modules, which are connected in parallel, having an input connected to said control section and an output electrically connected to some of said plurality of output current combining rails and being current combining rails, and being connected in conjunction with said first plurality of output power modules to form a bridge connected output;

load sharing means disposed in each of said first and second plurality of output power modules for causing load sharing among parallel connected modules;

a first current sampling resistor connected in one of said first plurality of output power modules near a common point of the bridge output;

a second current sampling resistor connected in one of said plurality of output power modules near a common point of the bridge output; and, differential combining means connected to said first current sampling resistor and second current sampling resistor for differentially combining the signals derived from said first and second current sampling resistors to provide a linear proportional current feedback signal.

5. A power controller as claimed in claim 4 wherein said differential combining means comprises:
a differential amplifier connected to said first current sampling resistor and said second current sampling resistor.

6. A power controller as claimed in claim 4 wherein said differential combining means comprises:
a first differential amplifier connected to said first current sampling resistor;
a second differential amplifier connected to said second current sampling resistor; and,
a third differential amplifier connected to receive the output of said first differential amplifier and said second differential amplifier to provide a current feedback signal.

7. A servo controller comprising:
a plurality of power output modules supplying the power output from said servo controller;
load sharing means disposed in each power module for providing relative load sharing by each power module;
combining means electrically connected to the power output terminals of each power module combining the power output of all power modules and mechanically supporting the associated power modules from the electrical output terminals;
each power module is mounted on an individual heat sink for dissipating heat from the circuit components;
means for electrically interconnecting the input to each power module; and,
feedback means deriving a feedback signal from each of said power output modules for controlling the servo controller.

8. A power processor comprising:
an input;
control circuit means connected to said input for controlling operation of the power processor;
an output section connected in a bridge configuration;
a pair of current sampling resistors one being connected in each of the bridge near a common point; and,
current feedback means for feeding a signal from said output section to said control circuit means comprising a first amplifier having an input connected to one of said pair of current sampling resistors, a second amplifier having an input connected to the other of said pair of said sampling resistors, and a third amplifier fed by said first amplifier and said second amplifier providing a current feedback signal.

9. A power processor as claimed in claim 8 wherein:
each side of the bridge configured output section is formed from a plurality of parallel connected output circuits; and,
load sharing means disposed in each output section for causing load sharing among the parallel connected output circuits.

10. A power processor as claimed in claim 9 wherein:
said output section is constructed so the entire load current passes through said pair of current sampling resistors.

11. A power processor as claimed in claim 9 wherein:
each of said plurality of parallel connected output circuits include a current sampling resistor;
current sampling resistor collector means combining the signals from the current sampling resistors on each side of the bridge and connecting them to said current feedback means.

12. A power processor as claimed in claim 9 wherein said current feedback means is connected to only one current sampling resistor on each side of the bridge.

13. A power processor as claimed in claim 9 wherein:
each parallel connected output circuit includes a current sampling resistor; and,
said current feedback means is connected to all current sampling resistors on each side of the bridge.

14. A servo controller comprising:
a bridge connected output section wherein each side of the bridge is formed from a plurality of parallel connected transistor output circuits;
a current sampling resistor disposed in each transistor output circuit;
load sharing means disposed in each transistor output circuit for causing load sharing among the transistor output circuits connected in parallel on the same side of the bridge;
a current feedback circuit connected to said bridge connected output section for providing a feedback signal from said bridge connected output section; and,
said current feedback circuit comprises amplifier means connected to both sides of said bridge connected output section to provide a current feedback signal.

15. A servo controller as claimed in claim 14 wherein said amplifier means comprises:
a single amplifier having a first input connected to a current sampling resistor on one side of the bridge and a second input connected to a current sampling resistor on the other side of the bridge.

16. A servo controller as claimed in claim 14 wherein said amplifier means comprises:
a first amplifier connected to one side of said bridge connected output;
a second amplifier connected to the other side of said bridge connected output; and,
a third amplifier connected to the output of said first amplifier and said second amplifier providing a current feedback signal.

17. A servo controller as claimed in claim 16 wherein:
said first amplifier is connected to all the current sampling resistors disposed in each transistor output circuit on one side of said bridge connected output; and, said second amplifier is connected to all the current sampling resistors disposed in each transistor output circuit on the other side of said bridge connected output.

18. A servo controller as claimed in claim 16 wherein:

said first amplifier is connected to only one of the current sampling resistors disposed in each transistor output circuit on one side of the bridge; and, said second amplifier is connected to only one of said current sampling resistors disposed in each transistor output circuit on the other side of the bridge.

19. A power controller comprising:
a first plurality of parallel output circuits each comprising,
  an input connected to the inputs of all other first plurality of parallel output circuits,
  a semi-conductor for controlling output current,
  a load sharing resistor having one end electrically connected to said semi-conductor and the other end connected to a common point,
a second plurality of parallel output circuits each comprising:
  an input connected to the inputs of all other second plurality of parallel output circuits,
  a semi-conductor for controlling output current,
  a load sharing resistor having one end electrically connected to said semi-conductor and the other end connected to a common point;
first driver means connected to drive all of said first plurality of parallel output circuits comprising an input and a connection to one of said sharing resistors, of said first plurality of parallel output circuits, at its connection to the associated semi-conductor; and,
second driver means connected to drive all of said second plurality of parallel output circuits comprising an input, connected to the same electrical point as the input to said first driver means, and a connection to one of said load sharing resistors, of said second plurality of parallel output circuits, at its connection to the associated semi-conductor whereby the output circuit to which said first driver means is connected at said load sharing resistor and the output circuit to which said second drive means is connected to said load sharing resistor conduct approximately the same amount of load current and hence all of said first plurality of output circuits and said second plurality of output circuits conduct approximately the same amount of load current.

20. A power controller as claimed in claim 19 comprising:
a current feedback circuit connected to one of said first plurality of parallel output circuits providing a current feedback signal which due to load sharing is representative of current flow in any of said first or second plurality of parallel output circuits.

21. A power processor comprising:
an input;
control circuit means connected to said input for controlling operation of the power processor;
an output section connected in a bridge configuration;
said output section comprising a plurality of modules each forming one side of a bridge;
a pair of current sampling resistors each being connected in one side of the bridge near a common point;
said output section constructed so the entire load current passes through said pair of current sampling resistors;
current feedback means connected to said pair of current sampling resistors for feeding a signal from said output section to said control circuit means; and,
said current feedback means comprises amplifier means having a first input connected to one of said pair of current sampling resistors and a second input connected to the other of said pair of current sampling resistors.

22. A power processor as claimed in claim 21 wherein said amplifier means comprises:
a first differential amplifier connected to one of said pair of current sampling resistors;
a second differential amplifier connected to the other of said pair of current sampling resistors; and,
a third differential amplifier fed by said first differential amplifier and said second differential amplifier providing a current feedback signal.

23. A power processor comprising:
a first output comprising,
  a first plurality of output circuits, each formed on a detachable module, connected in parallel,
  a first driver circuit connected to each of said first plurality of output circuits for controlling operation,
  first load sharing means connected to said first plurality of output circuits to force load sharing therebetween;
a second output connected for parallel operation with said first output comprising,
  a second plurality of output circuits, each formed on a detachable module, connected in parallel,
  a second driver circuit connected to each of said first plurality of output circuits for controlling operation,
  second load sharing means connected to said second plurality of output circuits to force load sharing therebetween; and,
driver load sharing means connected to said first driver circuit and said second driver circuit for controlling said first driver circuit and said second driver circuit so that each of said first plurality of output circuits and each of said second plurality of output circuits supply approximately the same amount of output current.

* * * * *